United States Patent
Zhu et al.

(10) Patent No.: US 11,216,218 B2
(45) Date of Patent: Jan. 4, 2022

(54) UNMAP DATA PATTERN FOR COARSE MAPPING MEMORY SUB-SYSTEM

(71) Applicant: Micron Technology, Inc., Boise, ID (US)

(72) Inventors: Fangfang Zhu, San Jose, CA (US); Ying Yu Tai, Mountain View, CA (US); Ning Chen, San Jose, CA (US); Jiangli Zhu, San Jose, CA (US); Alex Tang, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/855,470

(22) Filed: Apr. 22, 2020

(65) Prior Publication Data

US 2021/0019088 A1    Jan. 21, 2021

Related U.S. Application Data

(60) Provisional application No. 62/874,364, filed on Jul. 15, 2019.

(51) Int. Cl.
*G06F 3/00* (2006.01)
*G06F 3/06* (2006.01)
(Continued)

(52) U.S. Cl.
CPC .......... *G06F 3/0659* (2013.01); *G06F 3/0604* (2013.01); *G06F 3/0673* (2013.01); *G06F 11/1004* (2013.01); *G06F 13/1668* (2013.01)

(58) Field of Classification Search
CPC .... G06F 3/0659; G06F 3/0604; G06F 3/0673; G06F 11/1004; G06F 13/1668
See application file for complete search history.

(56) References Cited

U.S. PATENT DOCUMENTS

2013/0151754 A1* 6/2013 Post .................... G06F 12/0246
                                                                    711/103
2017/0315864 A1    11/2017 Craddock et al.
(Continued)

FOREIGN PATENT DOCUMENTS

KR    20190044968    5/2019

OTHER PUBLICATIONS

"International Application Serial No. PCT US2020 040547, International Search Report dated Oct. 13, 2020", 3 pgs.
(Continued)

*Primary Examiner* — Tammara R Peyton
(74) *Attorney, Agent, or Firm* — Schwegman Lundberg & Woessner, P.A.

(57) ABSTRACT

Devices, methods, and media are described for unmap support in coarse mapped storage. In one embodiment a controller of a memory sub-system manages a set of metadata for super management units (SMU) of the memory sub-system, wherein each SMU of the memory sub-system comprises a plurality of data management units (MU), and wherein each MU comprises a plurality of addressable memory elements as part of a coarse memory storage of the memory sub-system. The controller processes a trim command for a first SMU of the plurality of SMUs, and adjusts a trim bit associated with metadata for the first SMU. This trim bit can then be used to manage read and write operations as the trimmed unit waits to be written with an unmap data pattern. Similarly, a trim bit in MU metadata can be used manage related operations to prevent memory access errors.

20 Claims, 11 Drawing Sheets

(51) Int. Cl.
*G06F 11/10* (2006.01)
*G06F 13/16* (2006.01)

(56) References Cited

U.S. PATENT DOCUMENTS

| | | |
|---|---|---|
| 2018/0254086 A1 | 9/2018 | Grunzke |
| 2018/0267894 A1 | 9/2018 | Jangam et al. |
| 2018/0314643 A1 | 11/2018 | Park |
| 2019/0107957 A1* | 4/2019 | Helmick ............. G06F 12/0246 |

OTHER PUBLICATIONS

"International Application Serial No. PCT US2020 040547, Written Opinion dated Oct. 13, 2020", 5 pgs.

* cited by examiner

UNMAP DATA PATTERN FOR COARSE MAPPING MEMORY SUB-SYSTEM

PRIORITY CLAIM

This application claims priority to U.S. Provisional Patent Application Ser. No. 62/874,364, filed Jul. 15, 2019, which is incorporated herein by reference in its entirety.

TECHNICAL FIELD

Embodiments of the disclosure relate generally to memory sub-systems, and more specifically, relate to performing unmap operations in coarse mapping memory sub-systems.

BACKGROUND

A memory sub-system can be a storage device, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
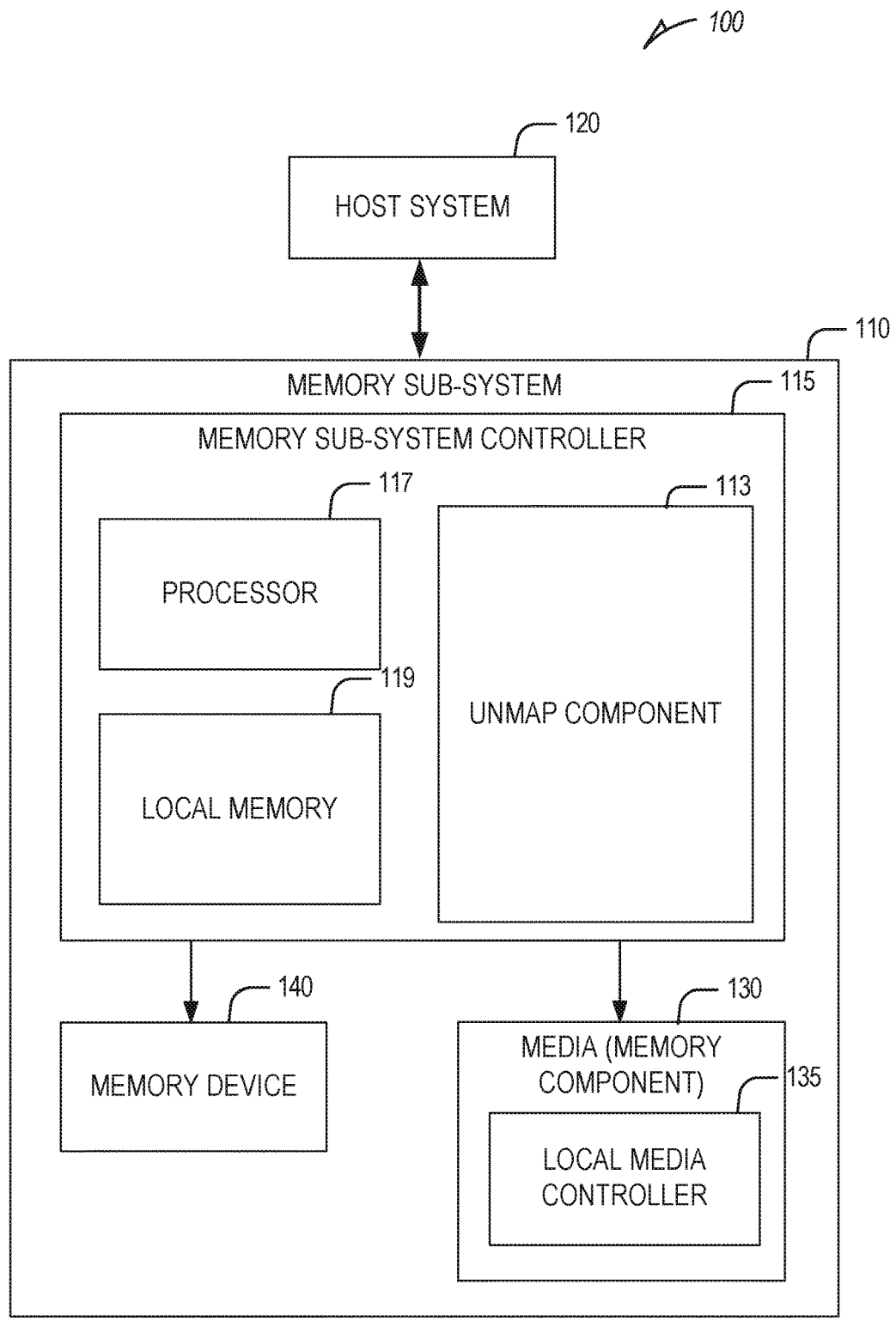
FIG. 1 illustrates an example computing environment that includes a memory sub-system in accordance with some embodiments of the present disclosure.

Aspects of the present disclosure are directed to performing trim or unmap operations for a coarse mapping memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

The host system can send access requests to the memory sub-system, such as to store data at the memory sub-system and to read data from the memory sub-system. The data to be read and written are hereinafter referred to as "user data." A host request can include a logical address (e.g., logical block address (LBA)) for the user data, which is the location the host system associates with the user data. The logical address (e.g., LBA) can be part of metadata for the user data.

The memory components can include non-volatile and volatile memory devices. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data.

The non-volatile memory devices can include, for example, three-dimensional cross-point ("3D cross-point") memory devices that are a cross-point array of non-volatile memory that can perform bit storage based on a change of bulk resistance, in conjunction with a stackable cross-gridded data access array.

Such non-volatile memory devices can group pages across dice and channels to form management units (MUs). An MU can include user data and corresponding metadata. A memory sub-system controller can send and receive user data and corresponding metadata as management units to and from memory devices. A super management unit (SMU) is a group of one or more MUs that are managed together. For example, a memory sub-system controller can perform media management operations (e.g., wear level operations, refresh operations, etc.) on SMUs.

A host system can send data and commands sent to a memory sub-system to notify the memory sub-system of logical addresses (e.g., logical block address) that contain data which is no longer in use and may be permanently erased. The command may be a trim command, unmap command, or a deallocate command.

Page sizes can vary for the different media types. For example, a cross-point array of non-volatile memory cells can have a significantly smaller page size than a flash-based memory component, and thus can have a significantly larger number of pages for storing data for a memory component of similar capacity. A memory device that has a large number of pages may use more computing resources (e.g., processing and memory resources) are used to retrieve, store, and sort data on the memory device. Additionally, a memory device that has a smaller page size may take more resources for managing the memory device.

Coarse mapping memory sub-systems, such as some memory sub-systems with cross-point memory devices can organize memory pages into MUs and SMUs. One purpose of grouping data units together can be to save metadata space and reduce system overhead of maintaining and managing the large number of pages.

Some memory sub-systems allow cryptographic erase using changes in a drive encryption key (DEK), with subsequent unmapping operations that occur quickly using flash translation layer (FTL) mapping. However, such fast unmapping operations are not possible for coarse mapping systems (e.g. cross-point systems). Although unmapping, unmap operations, unmap commands, trim operations, and trim commands are used throughout this document as particular examples, the present disclosure also applies to deallocating operations and deallocate commands.

In particular, in coarse mapping systems, no inherent structures exist for an unmap operation equivalent to flash memory system FTL mapping. Additionally, overwriting of unmapped data in coarse mapping systems is needed to avoid end-to-end (E2E) cyclic redundancy check (CRC) errors when reading from unmapped portions of the memory device, and such overwrite operations can take several minutes, which may result in memory sub-system performance delays. Furthermore, since the unmap operation is not performed by an inherent structure within the memory sub-system, the host controls the overwriting of data by providing a specific unmap data pattern to write to the unmapped portions of the memory device. The provision of data by the host consumes additional host resources.

Embodiments described herein include low memory footprint systems and operations to implement trim operations in coarse mapping memory sub-systems. Aspects of the disclosure and the described embodiments address the above and other deficiencies by providing structures and components to immediately serve trim or unmap commands while managing read and write operations to prevent E2E CRC errors for trimmed SMUs. Although trimmed SMUs and unmapped SMUs are used throughout this document as a particular example, the present disclosure also applies to trimmed MUs and unmapped MUs.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM). The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computing device, application specific computing device (e.g. for automotive, surveillance, etc.) or any such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a three-dimensional (3D) cross-point ("3D cross-point") type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

In some embodiments, each of the memory devices 130 can include one or more arrays of memory cells such as single level cells (SLCs), multi-level cells (MLCs), triple level cells (TLCs), quad-level cells (QLCs), or a combination of such. In some embodiments, a particular memory component can include an SLC portion, and an MLC portion, a TLC portion, or a QLC portion of memory cells. Each of the memory cells can store one or more bits of data used by the host system 120.

Furthermore, the memory cells of the memory devices 130 can be grouped as memory pages or memory blocks that can refer to a unit of the memory component used to store data. Memory pages can be grouped across dice and channels to form management units (MUs). An MU can include user data and corresponding metadata. A memory sub-system controller can send and receive user data and corresponding metadata as management units to and from memory devices. A super management unit (SMU) is a group of one or more MUs that are managed together. For example, a memory sub-system controller can perform media management operations (e.g., wear level operations, refresh operations, etc.) on SMUs. For example, a memory sub-system controller can perform media management operations (e.g., wear level operations, refresh operations, etc.) on SMUs.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA)) and a physical address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the media device 130 (e.g., perform media management operations on the media device 130). In some embodiments, the memory devices 130 can be locally managed memory devices, which is a raw memory device combined with a local media controller 135 that performs memory management operations on the memory device 130 within the same memory device package.

A data path refers to the logical course or path that user data and metadata follow as they move throughout the memory sub-system. The data path in the memory sub-system handles read and write data received from the host system. The data path encompasses the complete, end-to-end course taken by data as it is either written to or read from the underlying memory devices. A control path refers to the logical course or path that provides different control signals, for example, to components on the data path to control how the data path works properly. The control path and data path include digital circuitry, registers, and interconnecting buses.

The memory subsystem can include various components for data path protection to manage the movement of the user data within the memory subsystem, and protect the user data from corruption and errors. An MU can store user data (e.g. data received from a host system) and metadata associated with the user data. The metadata can for example, include a logical block address (LBA) for the location of a MU, or other such information about the data.

Data path protection can also include logical-to-physical (L2P) parity checks, LBA checks. E2E CRCs, error correction codes, or other such mechanisms for securing data (e.g., in a memory subsystem). Information for data path protection can, in some embodiments, be stored in the cache or buffer (e.g., DRAM) elements described above, or in any other such memory within a memory subsystem. The information can include metadata or other information describing SMUs, MUs, or aspects of hosts data and metadata within a memory subsystem. The information can be stored in data structures (e.g., tables, lists, etc.).

The memory sub-system 110 includes a unmap component 113 to improve the data path protection of a memory sub-system. The unmap component 113 includes features to allow unmapping of SMUs and/or MUs in memory subsystem 110. The unmap component 113 can track the data within the SMUs and MUs while allowing unmapping of the SMUs and/or MUs to prevent E2E CRC errors during a delay between serving of an unmap command and the overwriting of the unmapped data with a specified data pattern (e.g., overwriting the unmapped data with data that is all zero values, overwriting the unmapped data with a 0xDEADBEEF pattern, overwriting the unmapped data with an 0xAAAA pattern, or any suitable combination thereof).

This can include structures for tracking SMU level unmapping, as well as structures for MU level metadata.

In some embodiments, the memory sub-system controller 115 includes at least a portion of the unmap component 113. For example, the memory sub-system controller 115 can include a processor 117 (processing device) configured to execute instructions stored in local memory 119 for performing the operations described herein. In some embodiments, portions of unmap component 113 can be implemented using local media controller 135. In other embodiments, portions of unmap component 113 can be part of the host system 110, an application, or an operating system.

The aspects of the unmap component 113 can be integrated with existing data path protection elements of a memory sub-system 110, such as firmware processes or circuitry configured to implement path protection operations including unmap operations as described herein. In various embodiments, the unmap component 113 enables unmapping of data within memory device(s) 140 or media 130 without waiting for the unmapped data to be overwritten. The unmapping is served in real-time or near real-time, and unmap component 113 initiates management of operations to overwrite the unmapped data, while responding to read and/or write commands for the unmapped SMUs or MUs. While a first read or write to an unmapped SMU can be subject to additional latency, the unmap component manages serving of the unmap commands and responses to subsequent read and write operations for the unmapped SMUs to limit the impact of this additional latency. Further details with regards to the operations of the unmap component 113 are described below.

Figure 2A:
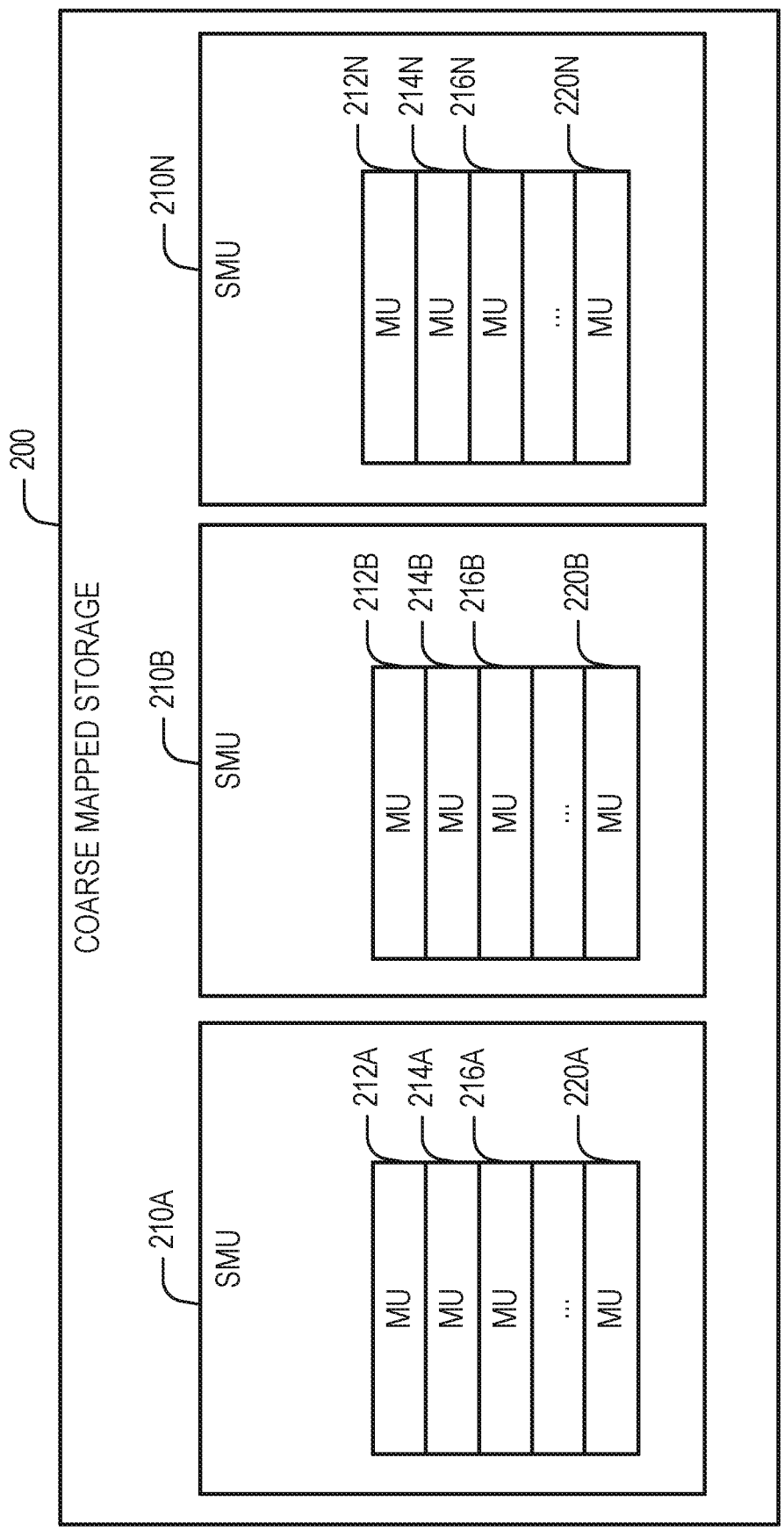
FIG. 2A illustrates aspects of an example memory sub-system in accordance with some embodiments of the present disclosure.

FIG. 2A illustrates aspects of an example memory structure of a memory sub-system in accordance with some embodiments of the present disclosure. As described herein, memory devices 130 can be configured with MU and SMU structures as illustrated by memory structure 200. In some embodiments, memory structure 200 is particularly cross-point memory as described above, with as a set of SMUs 210A through 210N.

Some non-volatile memory devices can group pages across dice and channels to form management units (MUs). An MU can include user data and corresponding metadata. A memory sub-system controller can send and receive user data and corresponding metadata as management units to and from memory devices. In some embodiments. MUs can be groups of dies, channels, pages, codewords, parity bits, memory cells, or a combination thereof. The MUs can enable a memory sub-system controller to manage (e.g., perform operations, procedures, and the like) on portions of the memory devices in allocated groups or sections of the media.

A super management unit (SMU) is a group of one or more MUs. The MUs in an SMU can be managed together. For example, a memory sub-system controller can perform initialization and media management operations (e.g., wear level operations, refresh operations, etc.) on SMUs.

In some embodiments, coarse mapped storage 200 is particularly cross-point memory as described above, structured as a set of SMUs 210A through 210N. Each SMU includes a corresponding set of MUs 212 through 220. For example, as shown, SMU 210A includes MUs 212A through 220A, and SMU 210N includes MUs 212N through 220N. In one example embodiment, a coarse mapped storage 200 system can have 100,000 SMUs, with each SMU containing 1000 MUs. Other embodiments of coarse mapped storage 200 can have different numbers of SMUs and MUs, with the balance of SMUs and MUs configured for efficient management of data storage. The memory cells of the memory devices can be organized into some number of individual units. For example, 3D cross-point memory devices can organize pages into MUs, and MU can be grouped into SMUs. In another example, NAND memory devices a group of pages forms a block. Individual units can represent individual segments of a memory device that can be written or erased in a single operation. MUs and SMUs are used as examples of a unit hereinafter.

As described herein, each MU can store user data and metadata. Such metadata as part of a MU can include LBA data, checksum or encoding data, or other such metadata. Some embodiments described herein use a MU trim metadata bit as part of the data structure of a MU to manage trim operations and prevent E2E CRC errors. The operation of such MU trim metadata bits is described in more detail below, particularly with respect to FIGS. 5 and 7.

Figure 2B:
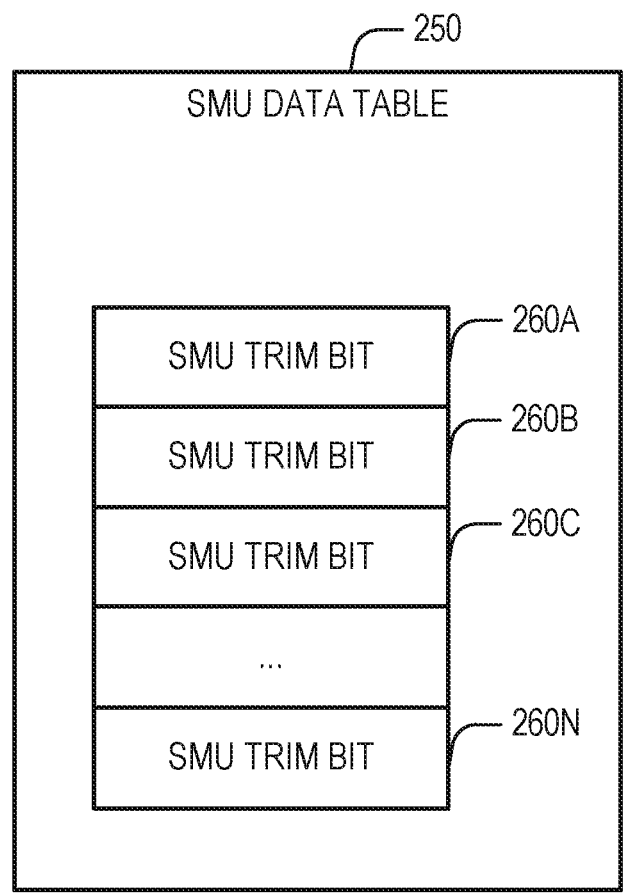
FIG. 2B illustrates aspects of an example memory sub-system in accordance with some embodiments of the present disclosure.

FIG. 2B illustrates further aspects of an example memory sub-system in accordance with some embodiments of the present disclosure. In addition to the structure of coarse mapped memory sub-system 200 described in FIG. 2A, such a coarse mapped memory sub-system can include SMU data tables 250 to store information about SMUs within the coarse mapped memory sub-system 200 and to assist in media management. SMU data table 250 can for example, include 100,000 entries in an embodiment of a memory sub-system with 100,000 SMUs in a coarse mapped memory sub-system. Each entry can include various information about the SMUs of the memory sub-system. For example, SMU data table 250 can include MU lists for each SMU, wear metrics such as write counts and read counts, data on failures and bad MUs or SMUs, or other such information.

As described herein, some embodiments of SMU data table 250 include, in addition to the above described information, an SMU trim bit 260 for each SMU of a coarse mapped storage 200. For example, a first SMU can be represented in SMU data table 250 by a variety of information about the SMU, including SMU trim bit 260A. Each SMU of represented in the SMU data table 250 similarly includes various information, including an associated SMU trim bit. These SMU trim bits 260A through 260N will therefore each be included along with other information about a corresponding SMU associated with each SMU trim bit 260A through 260N.

A "trim" operation, an "unmap" operation, and a "deallocate" operation enables a host device to inform a memory sub-system which portions of memory devices can be erased because they are no longer in use. As used herein, unmap, trim, and deallocate are used to refer to commands and operations to similarly enable a host device to inform a coarse mapped storage (e.g. cross-point memory) of portions of memory device that can be erased because they are no longer in use. Various operating systems and devices use different ones of the terms trim, unmap, and deallocate, but the underlying operations referred to are the same. Accordingly, trim, unmap, and deallocate as used as synonyms herein.

In some implementations, memory device 140 and/or media 130 can include non-volatile memory devices, such a non-volatile memory devices that include a cross-point array of non-volatile memory cells. A cross-point array of non-volatile memory can perform bit storage based on a change of bulk resistance, in conjunction with a stackable cross-gridded data access array. Additionally, in contrast to many flash-based memories that perform write out-of-place operations (e.g., data at location that is to be written is erased before other data can be programmed to the location), cross-point non-volatile memory can perform a write in-place operation, where a non-volatile memory cell can be programmed without the non-volatile memory cell being previously erased. Cross-point memory therefore has certain characteristics that differ from NAND flash memory. For example, the wear metrics for cross-point non-volatile memory cannot include an erase count due to the ability of the cross-point non-volatile memory to perform write in-place operations. Additionally, the characteristics of cross-point memory mean that, while a simple unmap command can reference large amounts of physical memory in a coarse mapping memory sub-system, the ability for the cross-point memory to respond provide the unmapped SMUs and MUs for use is limited by the latency for writing an unmap data pattern to the unmapped SMUs and MUs.

Figure 3:
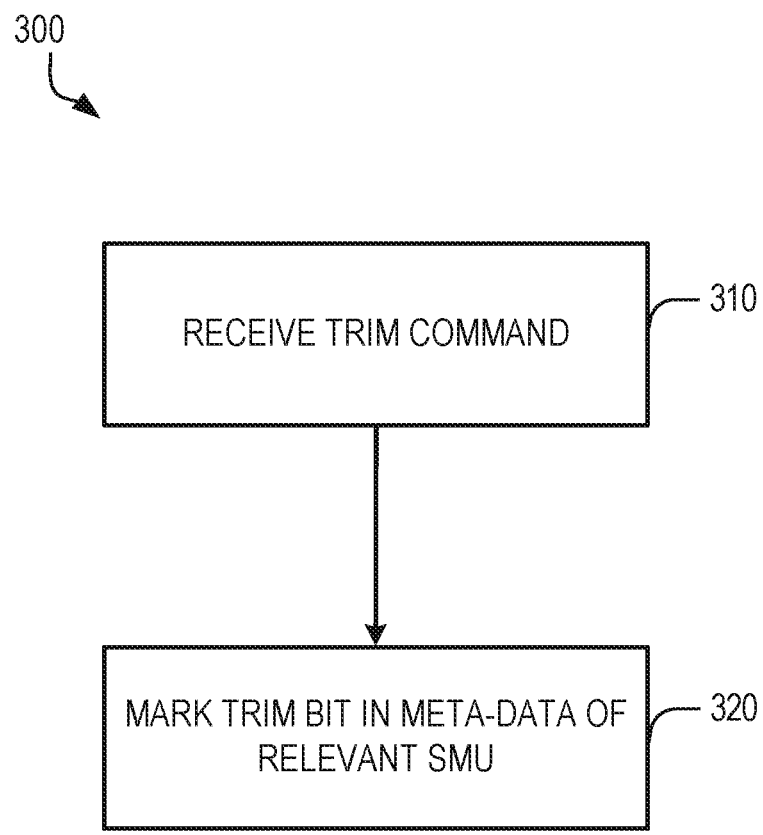
FIG. 3 is a flow diagram of an example method for unmap operations in a coarse mapping memory sub-system in accordance with some embodiments of the present disclosure.

FIG. 3 is a flow diagram of an example method 300 for unmap operations in a coarse mapping memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the unmap component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In method 300, a trim command is received at a processor in operation 310.

A trim bit in metadata for a relevant SMU is set (e.g. marked to indicate the associated SMU is the target of a trim or unmap command to indicate the SMU can be written with an unmap data pattern and repurposed) by the processor in operation 320. In embodiments with SMU data table 250, operation 320 involves adjusting an SMU trim bit (e.g. SMU trim bit 260A) to a set position. In various embodiments, a trim command of operation 310 can indicate any number of SMUs, and the corresponding operation 320 can then involve setting the associated trim bits corresponding to each SMU identified in the trim command.

After the SMU trim bit or bits are set, the memory system has essentially been informed that the SMUs are available to be repurposed, but due to the operation of cross-point memory, the trimmed SMUs can have an extensive latency before they can actually be used following writing the trimmed SMUs with an unmap data pattern. Depending on the size of the trimmed SMUs, the an unmap data pattern writing operation can take several minutes, which can result in an unacceptable latency. A system can scheduling an overwrite of data stored in the first SMU following adjusting of the trim bit associated with metadata for the first SMU. This overwrite can be performed when resources are available, rather than halting other higher priority operations to perform the overwrite. In some operations this can be done by monitoring, with a firmware background process operating on the memory controller (e.g. unmap component 113), an SMU data table 250 that holds the corresponding trim bit, and performing background overwrite operations when resources are available.

Figure 4:
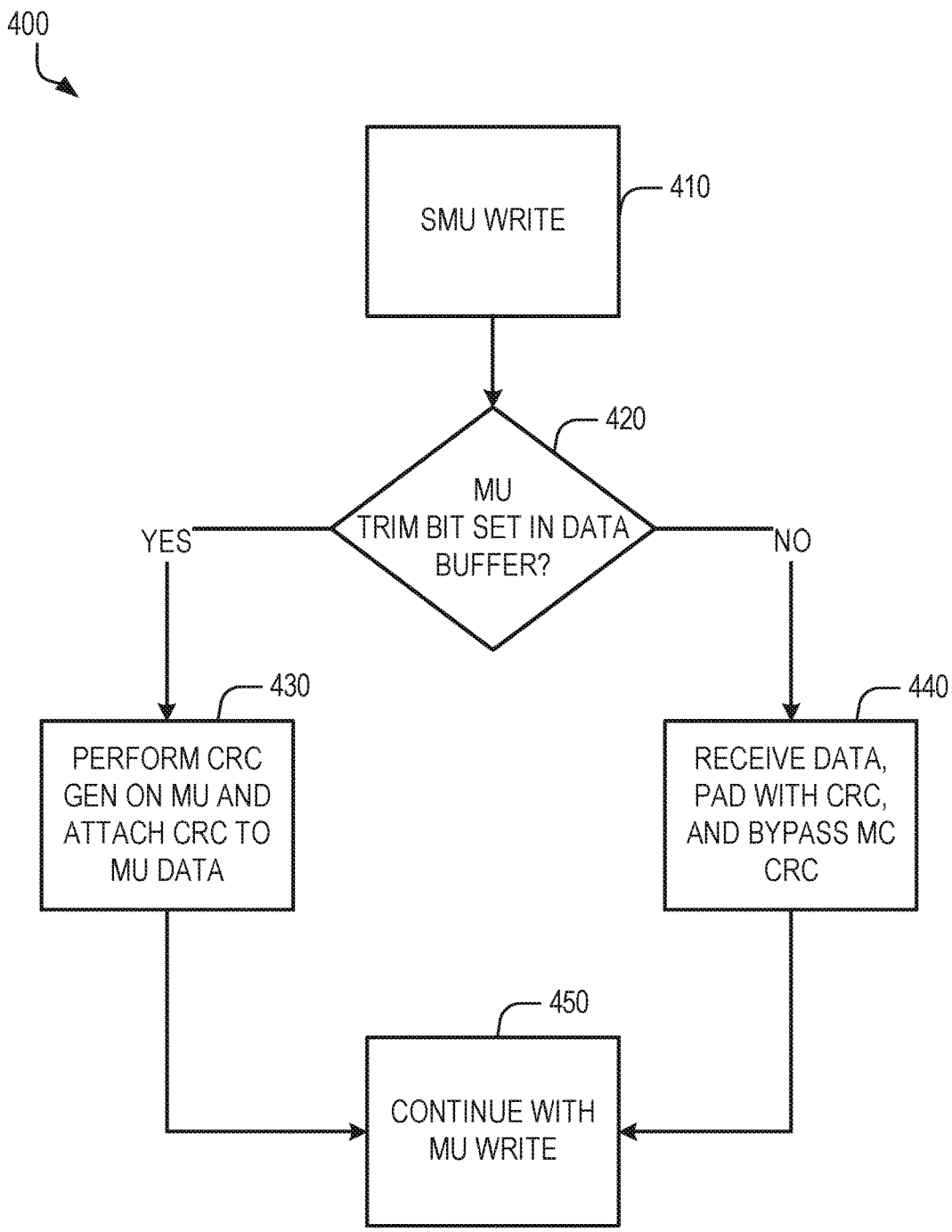
FIG. 4 is a flow diagram of an example method associated with unmap operations in a coarse mapping memory sub-system in accordance with some embodiments of the present disclosure.

FIG. 4 is a flow diagram of an example method 400 associated with unmap operations in a coarse mapping memory sub-system in accordance with some embodiments of the present disclosure. Just as above for method 300, the method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the unmap component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

Method 400 describes a write operation in a coarse mapping memory sub-system with trim support in accordance with embodiments described herein.

In operation 410, a write operation is initiated by the processor (e.g. at a memory controller such as memory controller 115 or at any other suitable controller circuitry) for an SMU to be written with an unmap data pattern. In one embodiment, the unmap data pattern includes bytes of zeros. This SMU write operation can be managed by firmware preparing bytes of zeros in response to a trim bit being set in the metadata for the SMU (e.g. in a table such as SMU data table 250). In other example embodiments, other unmap data patterns are used.

Prior to the unmap data pattern being written to each MU in the SMU, a data patch check is performed to determine if a trim bit in the data buffer (e.g. a MU metadata trim bit) is set or "on" as part of operation 420.

If the MU trim bit is set, then the controller generates a CRC for the MU in the memory controller write data path, and the CRC generated by the memory controller is attached to the data path in operation 430.

If the MU trim metadata bit is not set or is "off," then in operation 440, the unmap data pattern is padded with one zero bit and a CRC generated in a non-volatile memory express (NVME) controller. Generation of a CRC by the memory controller is bypassed in operation 440.

In either case, operations 430 and 440 both proceed with writing the unmap data pattern to the associated MU.

This method can be repeated until all MUs associated with the SMU write from operation 410 is complete. In some embodiments, this operation can be interrupted for other higher priority operations, and can cycle with pauses between operations for different MUs of an SMU. Similarly, some embodiments can involve such operations repeated for multiple SMUs identified together for SMU write operations.

Figure 5:
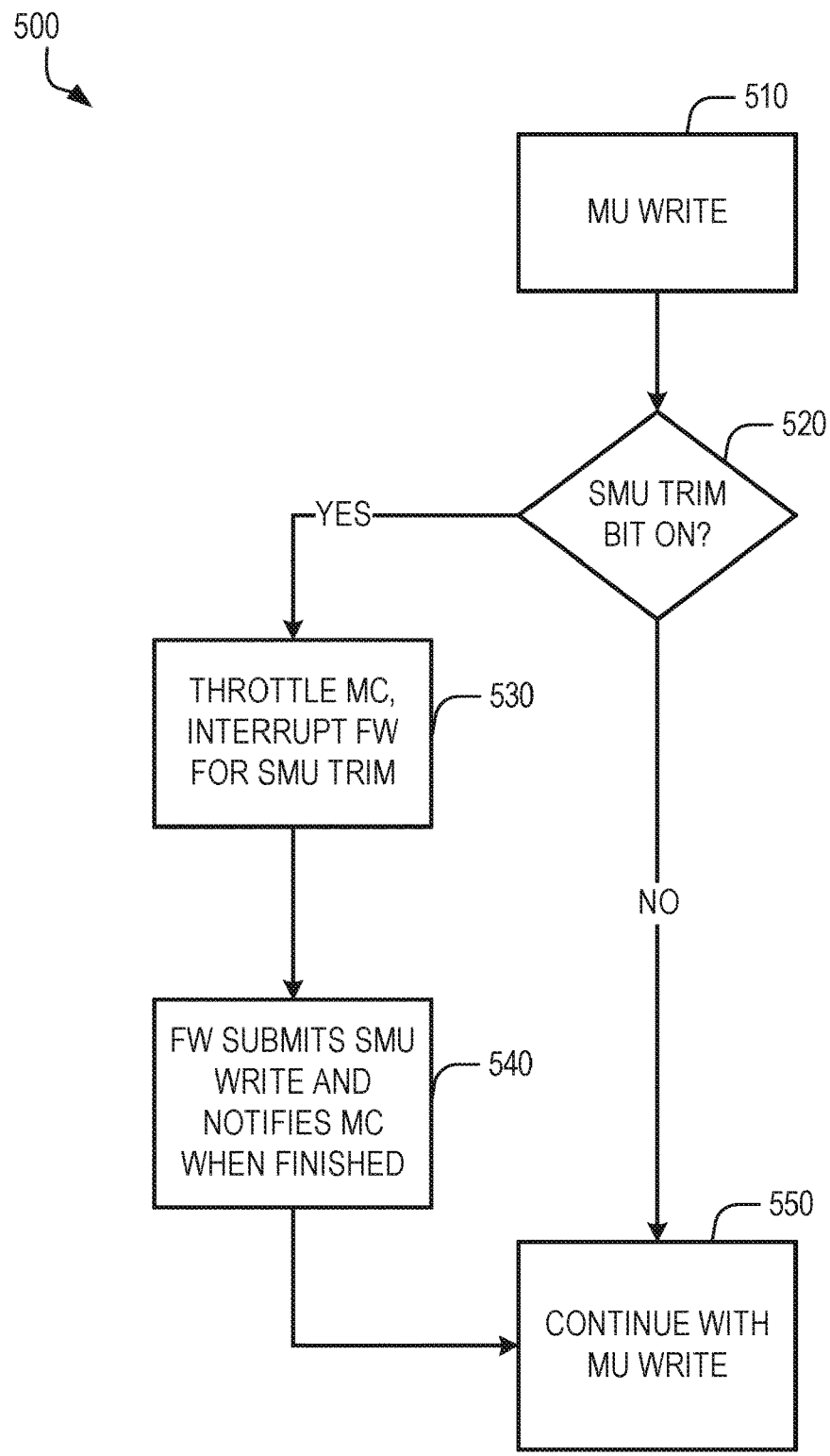
FIG. 5 is a flow diagram of an example method associated with unmap operations in a coarse mapping memory sub-system in accordance with some embodiments of the present disclosure.

FIG. 5 is a flow diagram of an example method 500 associated with unmap operations in a coarse mapping memory sub-system in accordance with some embodiments of the present disclosure. The method 500 can be performed by processing logic that can include hardware (e.g., processing device, circuitry, dedicated logic, programmable logic, microcode, hardware of a device, integrated circuit, or any suitable combination thereof), software (e.g., instructions run or executed on a processing device), or a combination thereof. In some embodiments, the method 500 is performed by the unmap component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

Method 500 begins with operation 510 where the processor receives a MU write command to write data to a first MU. For example, the host system 120 may send a write command to the memory sub-system 110 via a bus. The write command may identify an address (e.g., a logical address or a physical address) and a data value to be written.

In response to this write command, in operation 520, the processor checks the SMU trim bit for the SMU associated with the MU.

If the SMU trim bit is set (e.g. on), then in operation 530, the memory controller is throttled and firmware operations are interrupted for an SMU trim operation.

Following operation 530, in operation 540, the processor executed firmware submits an SMU write command (e.g. to overwrite all MUs in the SMU with an unmap data pattern), and then notifies the memory controller when the SMU write is finished.

Following completion of the SMU write completion notification in operation 540, the processor continues with writing of data to the MU indicated by the MU write command received in operation 510.

If the SMU trim bit is not set (e.g. is off), then the processor can simply proceed from operation 520 to the next operation for writing of data in operation 550. In operation 550, the data is written to the MU. In some example embodiments, an acknowledgement of the successfully-processed write command is provided to the host system 120 via the bus.

Essentially, in method 500, when a MU write command is received for a MU in an SMU with a serviced trim command where the SMU has not been written with an unmap data pattern, the memory controller interrupts other processes to make writing the unmap data pattern a priority so that the identified MU can be used. If an SMU has a serviced trim command, and the unmap data pattern was already written before any read or write for a MU in the SMU is received, the trim bit is unset following writing of the unmap data pattern, and the MU can be used without any interrupt as illustrated by operations 520 and 550 when the SMU trim bit is off.

Figure 6A:
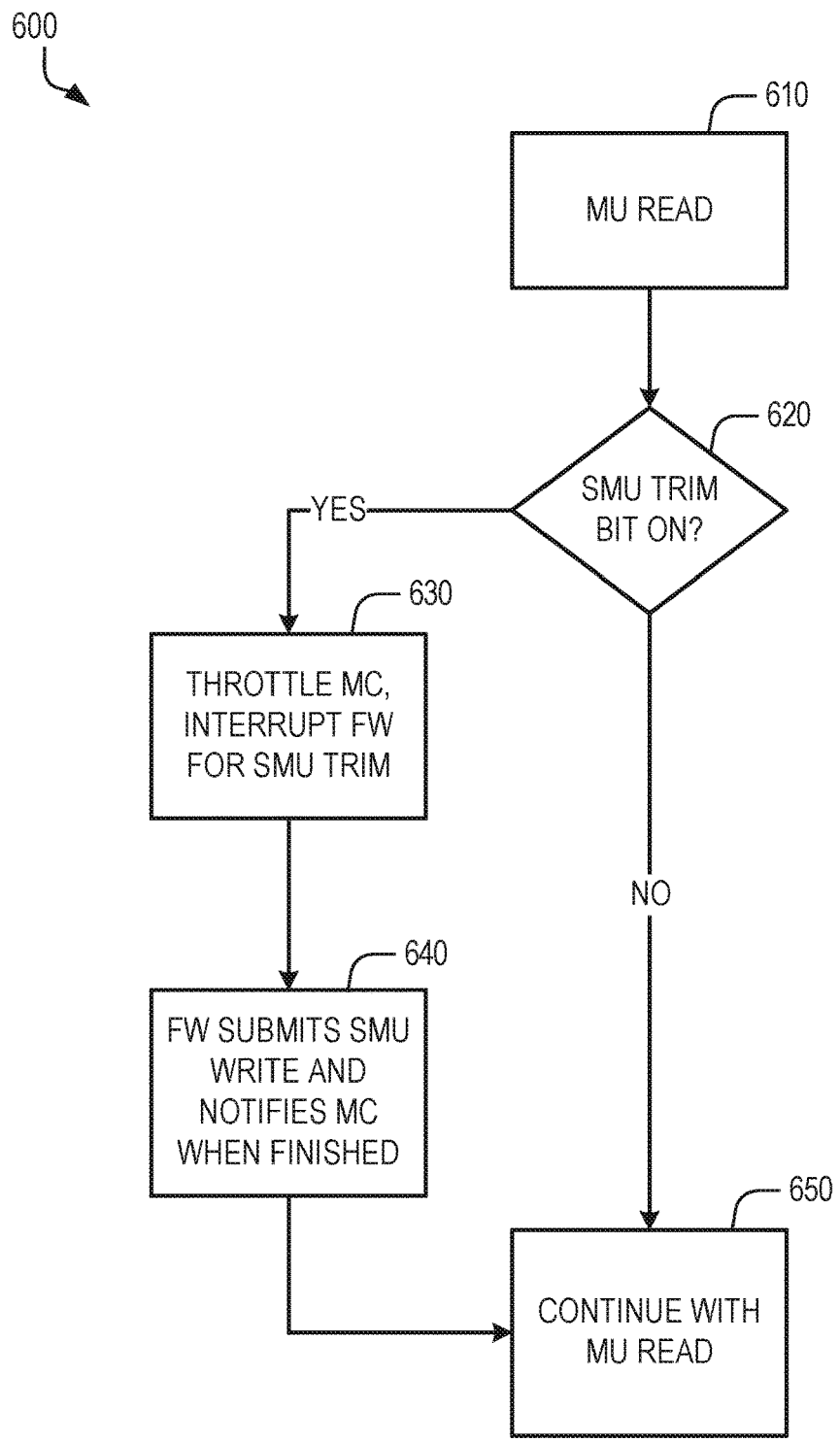
FIG. 6A is a flow diagram of aspects of an example method associated with unmap operations in a coarse mapping memory sub-system in accordance with some embodiments of the present disclosure.
Figure 6B:
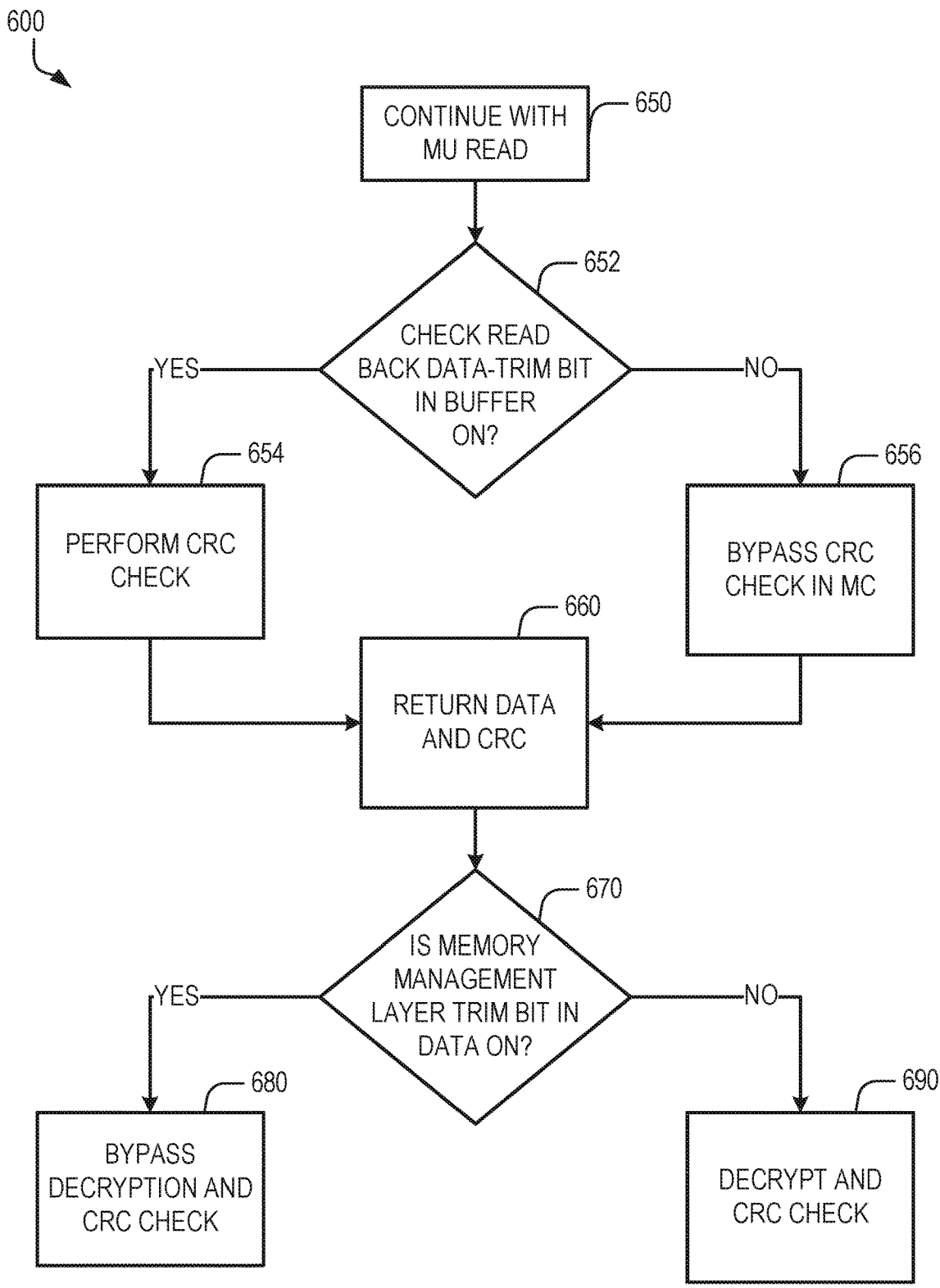
FIG. 6B is a flow diagram of aspects of an example method associated with unmap operations in a coarse mapping memory sub-system in accordance with some embodiments of the present disclosure.

FIG. 6A is a flow diagram of aspects of an example method associated with unmap operations in a coarse mapping memory sub-system in accordance with some embodiments of the present disclosure. FIGS. 6A and 6B together illustrate a method 600 for MU read operations. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the unmap component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Operations 610 through 650 proceed similarly to operations 510 through 550, but with a read command instead of a write command. In operation 610, the processor receives a MU read command to read data from a first MU. In response to this read command, in operation 620, the processor checks the SMU trim bit for the SMU associated with the MU. If the SMU trim bit is set (e.g. on), then operation 630, the memory controller is throttled and firmware operations are interrupted for an SMU trim operation to write an unmap data pattern to the MU. Following operation 630, in operation 640, the processor-executed firmware submits an SMU write command (e.g. to overwrite all MUs in the SMU with an unmap data pattern), and then notifies the memory controller when the SMU write is finished. Following completion of the SMU write completion notification in operation 650, the processor continues with reading data from the MU indicated by the MU read command received in operation 610. If the SMU trim bit is not set (e.g. is off), then the processor can simply proceed from operation 620 to the next operation for reading of data in operation 650.

FIG. 6B then continues from operation 650, and in operation 652, the processor checks read back data to determine if the MU trim bit in a data buffer is set (e.g., on).

If the trim bit is set during operation 652, then in operation 654, the processor performs a CRC check of the MU. Since operation 652 is performed in response to the receiving of the read command in operation 610 and before the performance of operation 660, returning the read data, operation 652 is in the memory controller read data path.

If the trim bit is not set in operation 652, then in operation 656, the memory controller CRC check is bypassed.

Regardless of whether the trim bit is set in the buffer in operation 652, in operation 660 following either operation 654 or 656, the read data and an associated CRC is returned.

Then, in operation 670, a check is performed in the memory management layer (MML) to determine whether a trim bit in the data is on. In some embodiments, this operation can be performed by a local media controller such as local media controller 135 including elements of unmap component 113. In other embodiments, this operation can be performed by any other processing circuitry of a host 120 or memory subsystem 110 configured for MML operations.

If the trim bit is on in operation 670, the processor bypasses decryption and CRC checking in operation 680.

If the trim bit in operation 670 is not on, then in operation 690, the data is decrypted and a CRC check is performed.

Figure 7:
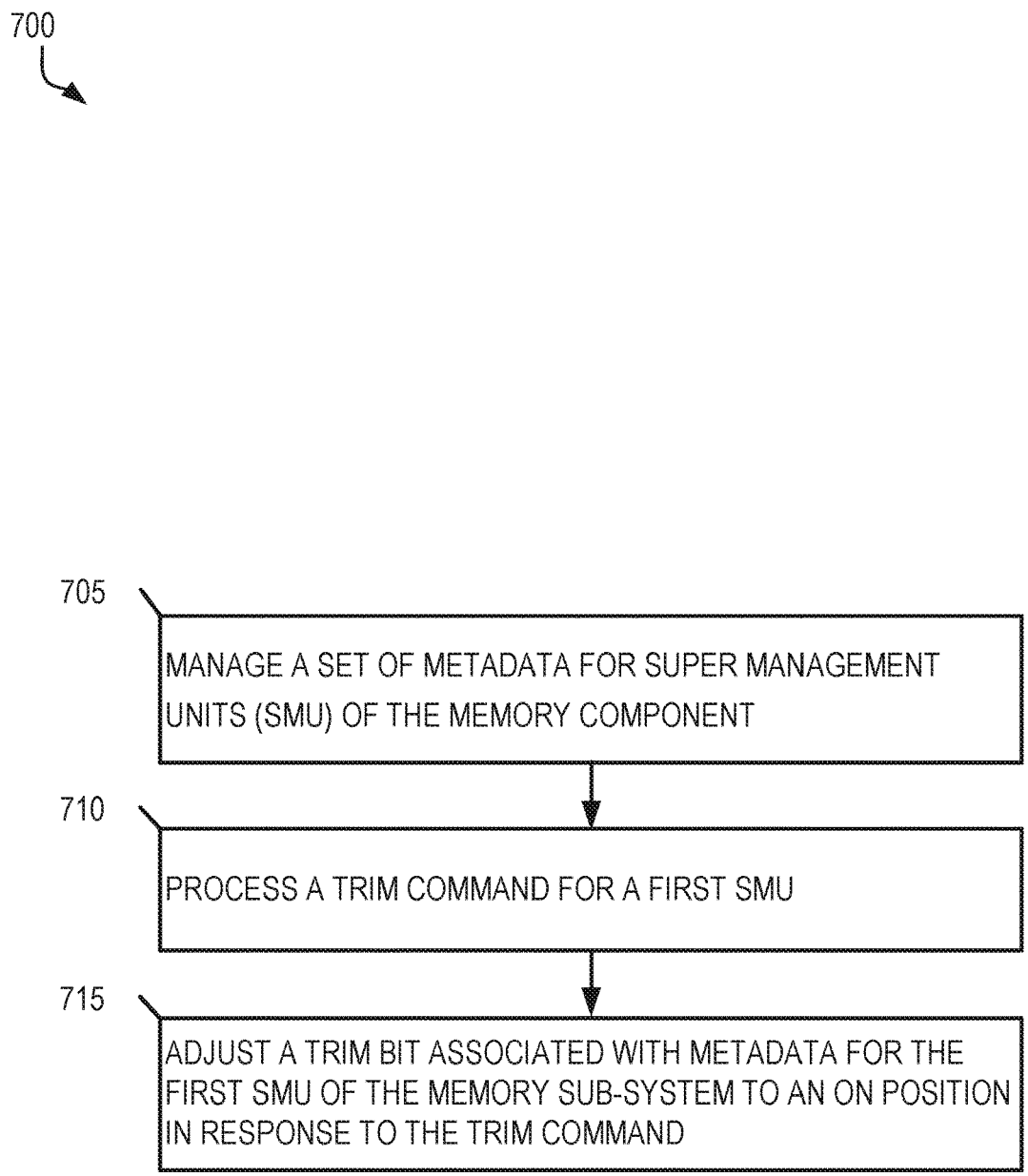
FIG. 7 is a flow diagram of an example method for unmap operations in a coarse mapping memory sub-system in accordance with some embodiments of the present disclosure.

FIG. 7 is a flow diagram of an example method 700 for unmap operations in a coarse mapping memory sub-system in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the unmap component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In operation 705 of method 700, a processors of a memory subsystem manages set of metadata for super management units (SMU) of the memory sub-system, wherein each SMU of the memory sub-system comprises a plurality of data management units (MU), and wherein each MU of the plurality of MUs for each SMU comprises a plurality of addressable memory elements as part of a coarse memory storage of the memory sub-system. Such a coarse memory storage can be cross-point memory as described above.

In operation 710, a trim command (e.g. from a host 120) is processed for a first SMU of the plurality of SMUs.

Then in operation 715, the processors adjusts a trim bit associated with metadata for the first SMU of the memory sub-system to an on position in response to the trim command.

This trim bit can then be used by the system in various ways. In some embodiments, the processor then schedules an overwrite of data stored in the first SMU following adjusting of the trim bit associated with metadata for the first SMU. Some such embodiments operate by monitoring, by a firmware background process operating on a memory controller, one or more metadata tables comprising metadata for said each SMU of the memory sub-system, where the one or more metadata tables further include a corresponding trim bit for said each SMU of the memory subsystem and the trim bit associated with the metadata for the first SMU. Some such embodiments operate the firmware background process submits an SMU level write command to write a corresponding SMU of said each SMU with an unmap data pattern when the corresponding trim bit is set for the corresponding SMU. When the write command to write an SMU with the unmap data pattern is complete, the trim bit can further be adjusted (e.g. to an off or not set position).

Some embodiments operate by receiving, from a host, an access operation associated with the first SMU while the trim bit associated with metadata for the first SMU is in the on position, and in response to receiving the access operation associated with the first SMU while the trim bit associated with metadata for the first SMU is in the on position, immediately triggering the overwrite of data stored in the first SMU to write the first SMU with an unmap data pattern. Other embodiments can operate by stalling the access operation until the overwrite of data stored in the first SMU is finished.

In some embodiments, in response to the adjusting of the trim bit associated with metadata for the first SMU, a processor can set a MU trim metadata bit for each MU of the first SMU when encryption, decryption and end-to-end (E2E) cyclic redundancy checksum (CRC) data checks for the memory sub-system are configured to be performed by the controller, where the MU trim metadata bit for said each MU of the first SMU indicates that a corresponding MU is not protected by E2E CRC. Some such embodiments operate with the controller is configured to generate CRCs for each MU of the first SMU and to perform E2E CRC operations internally when the MU trim metadata bit is set for the corresponding MU. Some embodiments can operate by bypassing decryption and E2E CRC data checks when the MU trim metadata bit for the corresponding MU is set.

Some embodiments can further operate by interrupting a logical to physical (L2P) process for the first SMU in response to the trim bit being set by stalling file encryption (FE) command processing for the first SMU and triggering a firmware write operation. The triggered firmware write operation can write each MU of the first SMU with an unmap data pattern and a MU trim metadata bit that indicates no E2E CRC. Some such embodiments further operate by generating, by the controller, a corresponding internal CRC for said each MU of the first SMU, and writing, by the controller, the unmap data pattern to said each MU of the first SMU following generation of the corresponding internal CRC for said each MU of the first SMU. Some such embodiments further resume the L2P process following the controller writing the unmap data pattern to said each MU of the first SMU. Further such embodiments can receive, prior to the interrupting of the L2P process for the first SMU, a host read communication, and return the unmap data pattern in response to the host read communication following the writing the unmap data pattern to said each MU of the first SMU.

Figure 8:
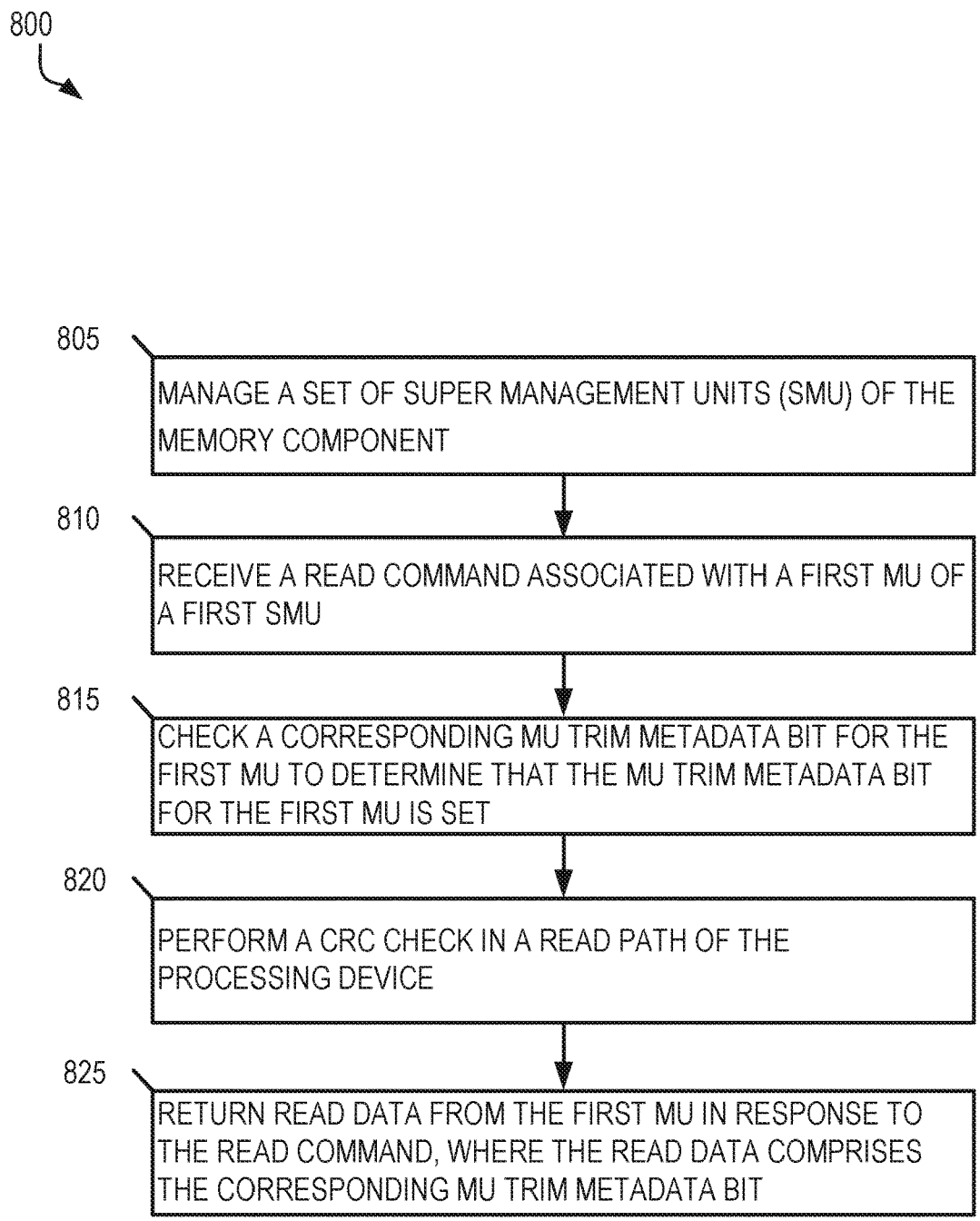
FIG. 8 is a flow diagram of an example method for unmap operations in a coarse mapping memory sub-system in accordance with some embodiments of the present disclosure.

FIG. 8 is a flow diagram of an example method for unmap operations in a coarse mapping memory sub-system in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the unmap component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In contrast to method 700, which focuses on the SMU trim bit in metadata for an SMU (e.g. SMU trim bits 260A-N in SMU data table 250), method 800 describes the use of MU metadata trim bits (e.g. stored in for each MU in the specific memory of the MU such as for any of MUs 212-220 A-N). In method 800, operation 805 a processor manages a set of super management units (SMU) of the memory component, wherein each SMU of the memory component comprises a plurality of data management units (MU), and wherein each MU of the plurality of MUs for each SMU include a plurality of memory elements, corresponding logical block address (LBA) data and a MU trim metadata bit configured to indicate whether a corresponding MU is protected by an end-to-end (E2E) cyclic redundancy checksum (CRC). In operation 810, the processor then receives a read command associated with a first MU of a first SMU. In operation 815, the processor checks a corresponding MU trim metadata bit for the first MU to determine that the MU trim metadata bit for the first MU is set. In operation 820, the processor performs a CRC check in a read path of the processing device. In operation 825, the processor returns read data from the first MU in response to the read command, wherein the read data comprises the corresponding MU trim metadata bit.

In some embodiments, a media controller operates with the processor, with the processor configured to pass the read data to the media controller following the CRC check in the read path of the processing device, and then the media controller configured to process the read data in an MML of the media controller following the performing the CRC check in the read path of the processing device to determine that the MU trim metadata bit for the first MU is set in the read data. MML decryption and MML CRC check operations are then bypassed in the MML in response to determining the MU trim metadata bit for the first MU is set in the read data.

Some embodiments can operate where a trim command is processed for the first SMU prior to receiving the read command, and a trim bit is adjusted associated with metadata for the first SMU of the memory component to a set position in response to the trim command.

In some of these embodiments, the processing device is further operatively coupled with the memory component to write an unmap data pattern to the first MU and set the MU trim metadata bit in response to the adjusting the trim bit to the set position for the first SMU.

The above thus describes various methods associated with implementing a low memory footprint system for implementing unmap within coarse mapping memory sub-system. While specific methods and operations are described above, it will be apparent that additional methods with repeated and intervening operations are possible within the scope of the described system.

Figure 9:
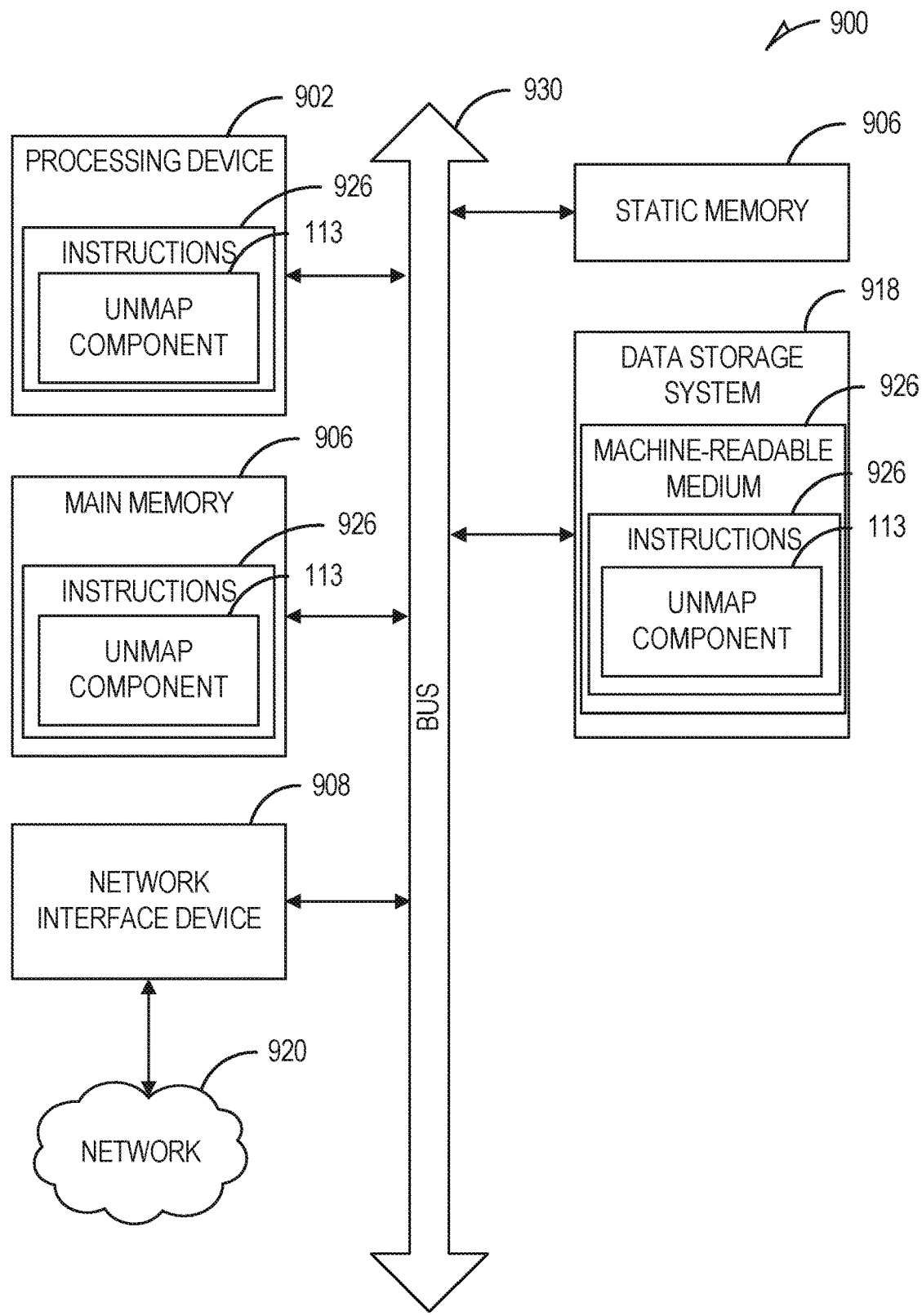
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the unmap component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a unmap component (e.g., the unmap component 113 of FIG. 1) which can be used to service unmap commands with a low memory footprint and to manage read and write operations within the context of such unmap capabilities while avoiding CRC errors and other such issues. While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory controller configured to perform operations comprising:
   receiving a data access command for a data management unit of a plurality of data management units of a super management unit; in response to the receiving of the data access command and based on a value of an unmap bit that corresponds to the data management unit: writing an unmap data pattern to the data management unit; and modifying the value of the unmap bit that corresponds to the data management unit; and after the writing of the unmap data pattern to the data management unit, processing the data access command.

2. The memory controller of claim 1, wherein:
   the receiving of the data access command comprises receiving a read command via a bus; and
   the processing of the data access command comprises:
      reading data from the data management unit; and
      providing the data via the bus.

3. The memory controller of claim 2, wherein the operations further comprise:
   after the reading of the data from the data management unit, based on the writing of the unmap data pattern to the data management unit, determining a cyclic redundancy check (CRC) value of the data management unit; and
   storing the CRC value.

4. The memory controller of claim 2, wherein the operations further comprise:
   after the reading of the data from the data management unit, accessing a stored cyclic redundancy check (CRC) value of the data management unit;
   determining, based on the read data, a CRC value of the data management unit; and
   comparing the accessed CRC value with the determined CRC value to detect memory corruption.

5. The memory controller of claim 1, wherein the operations further comprise:
   prior to the receiving of the data access command, receiving an unmap data command; and
   based on the unmap data command, setting the value of the unmap bit that corresponds to the data management unit.

6. The memory controller of claim 1, wherein:
   the receiving of the data access command comprises receiving a write command via a bus; and
   the processing of the data access command comprises:
      writing data to the data management unit; and
      providing an acknowledgement via the bus.

7. The memory controller of claim 1, wherein the operations are performed by a processor of the memory controller, configured by instructions stored in firmware.

8. A method comprising: receiving, by a processor of a memory controller, a data access command for a data management unit of a plurality of data management units of a super management unit; in response to the receiving of the data access command and based on a value of an unmap bit that corresponds to the data management unit: writing an unmap data pattern to the data management unit; and modifying the value of the unmap bit that corresponds to the data management unit; and after the writing of the unmap data pattern to the data management unit, processing the data access command.

9. The method of claim 8, wherein:
   the receiving of the data access command comprises receiving a read command via a bus; and
   the processing of the data access command comprises:
      reading data from the data management unit; and
      providing the data via the bus.

10. The method of claim 9, further comprising:
    after the reading of the data from the data management unit, based on the writing of the unmap data pattern to the data management unit, determining a cyclic redundancy check (CRC) value of the data management unit; and
    storing the CRC value.

11. The method of claim 9, further comprising:
    after the reading of the data from the data management unit, accessing a stored cyclic redundancy check (CRC) value of the data management unit;
    determining, based on the read data, a CRC value of the data management unit; and
    comparing the accessed CRC value with the determined CRC value to detect memory corruption.

12. The method of claim 8, further comprising:
    prior to the receiving of the data access command, receiving an unmap data command; and based on the unmap data command, setting the value of the unmap bit that corresponds to the data management unit.

13. The method of claim 8, wherein:
the receiving of the data access command comprises receiving a write command via a bus; and
the processing of the data access command comprises:
writing data to the data management unit; and
providing an acknowledgement via the bus.

14. The method of claim 8, wherein the processor of the memory controller is configured by instructions stored in firmware.

15. A memory system comprising: a memory, and a memory controller configured to perform operations comprising: receiving a data access command for a data management unit of a plurality of data management units of a super management unit; in response to the receiving of the data access command and based on a value of an unmap bit that corresponds to the data management unit: writing an unmap data pattern to the data management unit; and modifying the value of the unmap bit that corresponds to the data management unit; and after the writing of the unmap data pattern to the data management unit, processing the data access command.

16. The memory system of claim 15, wherein:
the receiving of the data access command comprises receiving a read command via a bus; and
the processing of the data access command comprises:
reading data from the data management unit; and
providing the data via the bus.

17. The memory system of claim 16, wherein the operations further comprise:
after the reading of the data from the data management unit, based on the writing of the unmap data pattern to the data management unit, determining a cyclic redundancy check (CRC) value of the data management unit; and
storing the CRC value.

18. The memory system of claim 16, wherein the operations further comprise:
after the reading of the data from the data management unit, accessing a stored cyclic redundancy check (CRC) value of the data management unit;
determining, based on the read data, a CRC value of the data management unit; and
comparing the accessed CRC value with the determined CRC value to detect memory corruption.

19. The memory system of claim 15, wherein the operations further comprise:
prior to the receiving of the data access command, receiving an unmap data command; and
based on the unmap data command, setting the value of the unmap bit that corresponds to the data management unit.

20. The memory system of claim 15, wherein:
the receiving of the data access command comprises receiving a write command via a bus; and
the processing of the data access command comprises:
writing data to the data management unit; and
providing an acknowledgement via the bus.

* * * * *